E. HAUSE & L. KELLEY.
ANIMAL TRAP.

No. 117,072. PATENTED JUL 18 1871

ATTEST
Myron H. Church
H. F. Eberts

INVENTORS,
Elmer Hause
Libni Kelley
per attorney
Thos. S. Sprague

pending …

UNITED STATES PATENT OFFICE.

ELMER HAUSE AND LIBNI KELLEY, OF TECUMSEH, MICHIGAN.

IMPROVEMENT IN ANIMAL-TRAPS.

Specification forming part of Letters Patent No. 117,072, dated July 18, 1871.

*To all whom it may concern:*

Be it known that we, ELMER HAUSE and LIBNI KELLEY, of Tecumseh, in the county of Lenawee and State of Michigan, have invented a new and useful Improvement in Animal-Traps; and we do declare that the following is a true and accurate description thereof, reference being had to the accompanying drawing and to the letters of reference marked thereon, and being a part of this specification, in which—

Figure 1:
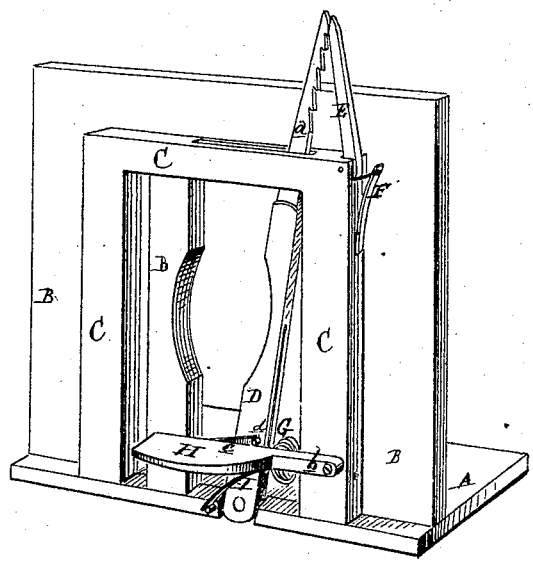
Figure 2:
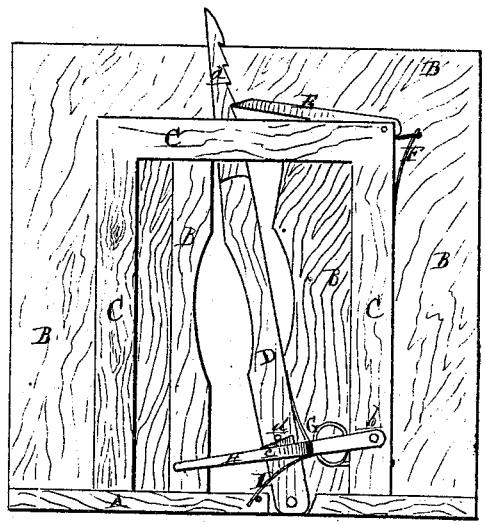

Figure 1 is a perspective view of our device with the trap set, and Fig. 2 is an elevation of the same with the trap sprung.

Similar letters of reference indicate corresponding parts in the several figures.

The nature of this invention relates to a trap more especially designed for catching and holding hogs as they issue from a pen, although applicable in other cases; and it consists in the novel and peculiar construction of the same, and in the arrangement of the various parts, as more fully hereinafter set forth.

In the drawing, A represents a sill, and B one of the walls of a hog-pen of ordinary construction. On the outer side of the door-way, or other opening in the wall of the pen, I erect a framework, C, which may be mortised in the sill or otherwise secured to the pen, the opening in which should be of sufficient size to permit of the passage of the animal through the same. D is a lever pivoted at its lower end to the sill at one side of the opening in the wall, with its upper end projecting up through and playing freely in a slot in the upper chord of the frame. The outer edge of the lever above the frame is provided with a ratchet, $a$, with which engages a pawl, E, thrown forward by a spring, F, as shown. The lever is thrown toward the opposite side of the opening by a spring, G. H is a treadle pivoted at $b$ to the frame, and is supported across the opening by a spring, I. It is provided with a stationary cam-latch, $c$, the square end of which comes in front of a pin, $d$, on the lever D, when the latter is drawn back to set and hold it, the operation of setting being facilitated by the spring I, which throws up the treadle. When it is desired to catch and hold firmly a hog for ringing his nose, castrating, or killing him, the trap is set as shown in Fig. 1. As he passes through the opening he naturally places a fore foot upon the treadle, which releases the lever D, which is thrown over against his neck by the spring G compressing it against the opposite side of the opening, while the pawl E is thrown forward to engage with the ratchet by the spring F, and thus securely hold the animal.

With slight modifications and adaptation to size, this trap may be successfully employed to trap animals of all sizes; and if desired to kill them as caught, metal spikes may be placed so as to project from the inner edge of the lever and the edge of the opening at the opposite side.

What we claim as our invention, and desire to secure by Letters Patent, is—

The construction and arrangement of the frame C, lever D, pawl E, springs F G, treadle H, spring I, cam-latch $c$, and pin $d$, with relation to each other and the opening in the wall A, substantially as described.

ELMER HAUSE.
LIBNI KELLEY.

Witnesses:
CHARLES BURRIDGE,
GEORGE CURTIS.